Figure 1:
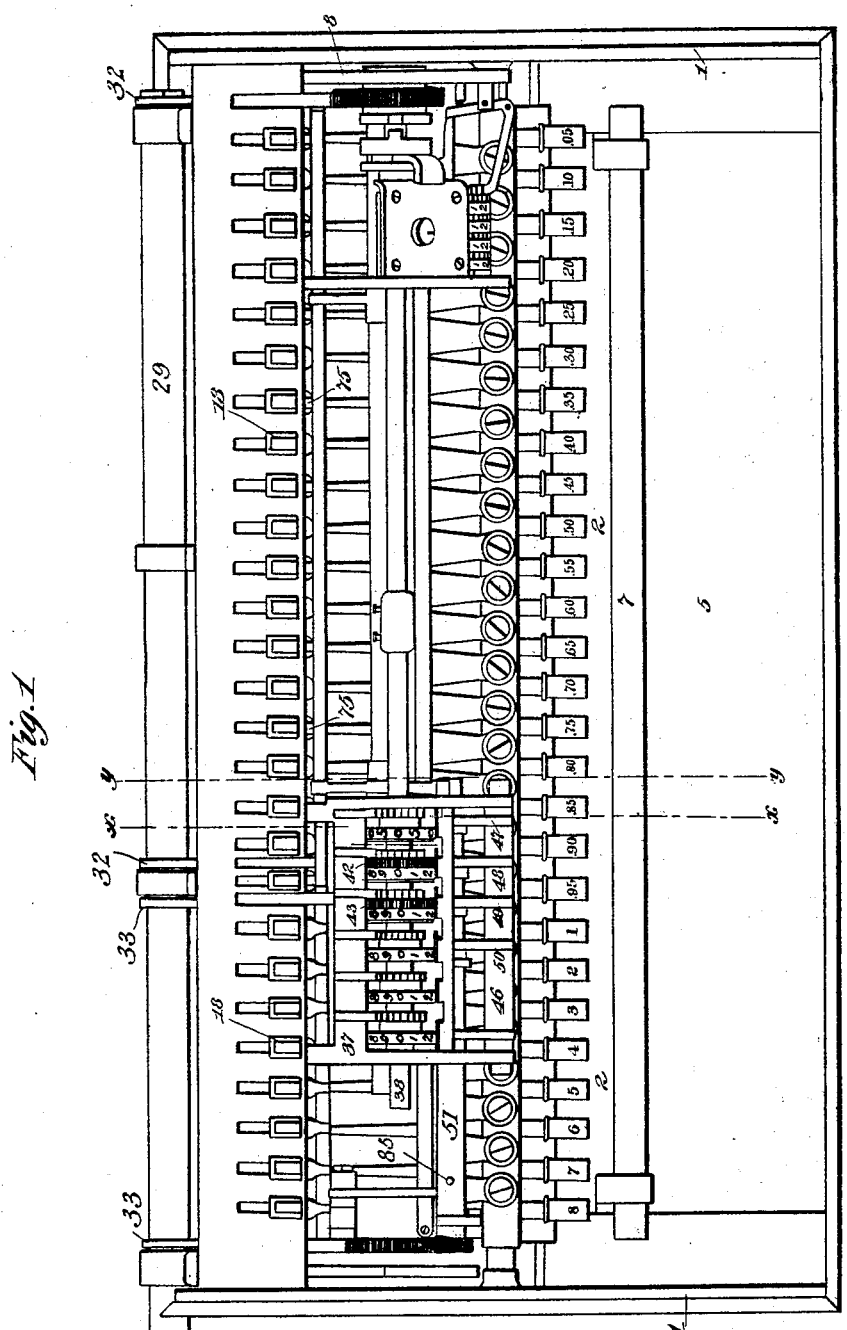

No. 715,850. Patented Dec. 16, 1902.
F. C. OSBORN.
CASH REGISTER.
(Application filed Jan. 31, 1899.)

(No Model.) 10 Sheets—Sheet 1.

WITNESSES
Archibald G. Reese
Jno. R. Taylor

INVENTOR
Francis C. Osborn
By Rich. N. Dyer
Atty

No. 715,850. Patented Dec. 16, 1902.
F. C. OSBORN.
CASH REGISTER.
(Application filed Jan. 31, 1899.)

(No Model.) 10 Sheets—Sheet 3.

WITNESSES INVENTOR

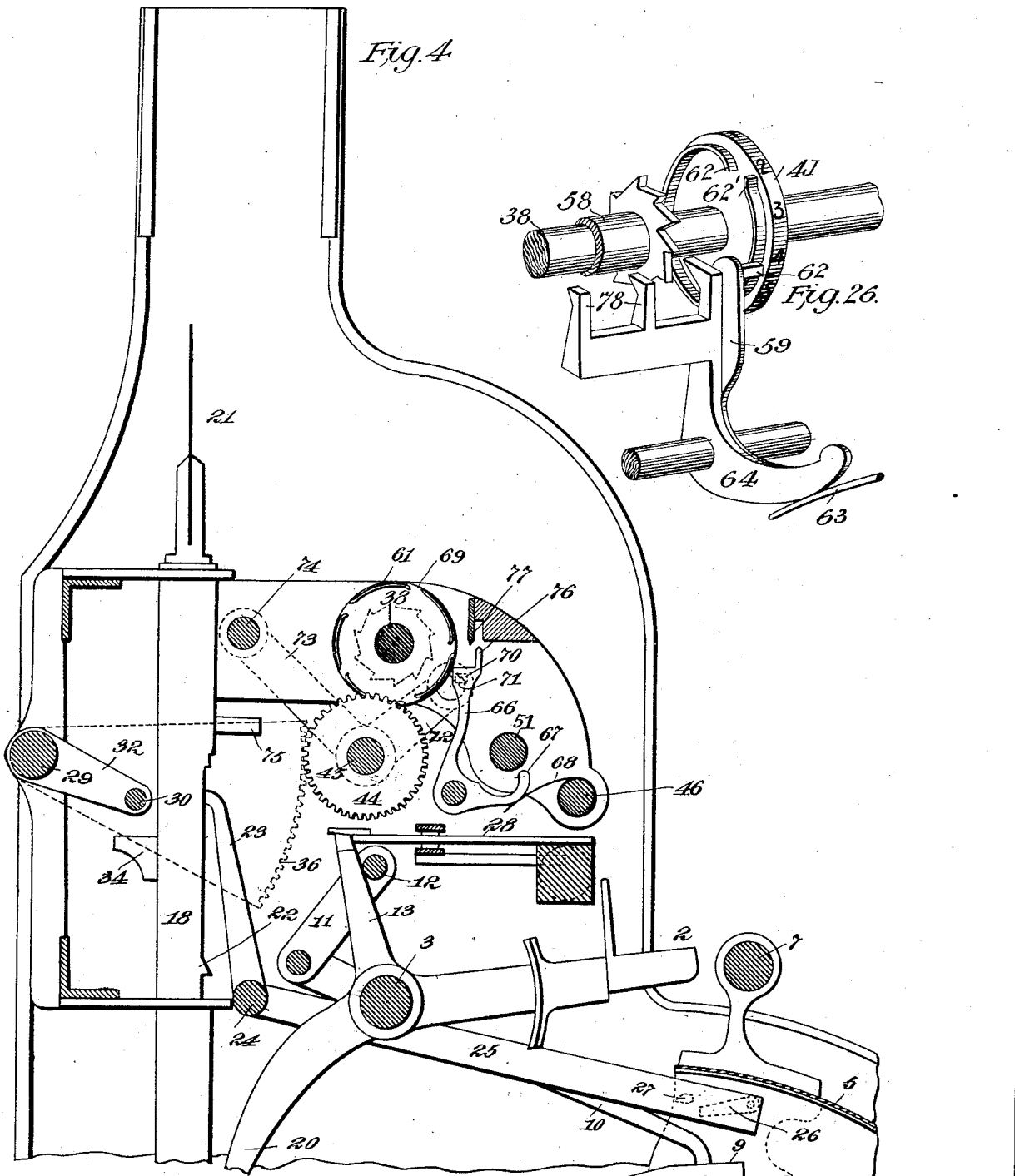

No. 715,850.
F. C. OSBORN.
CASH REGISTER.
(Application filed Jan. 31, 1899.)
(No Model.)
Patented Dec. 16, 1902.
10 Sheets—Sheet 5.
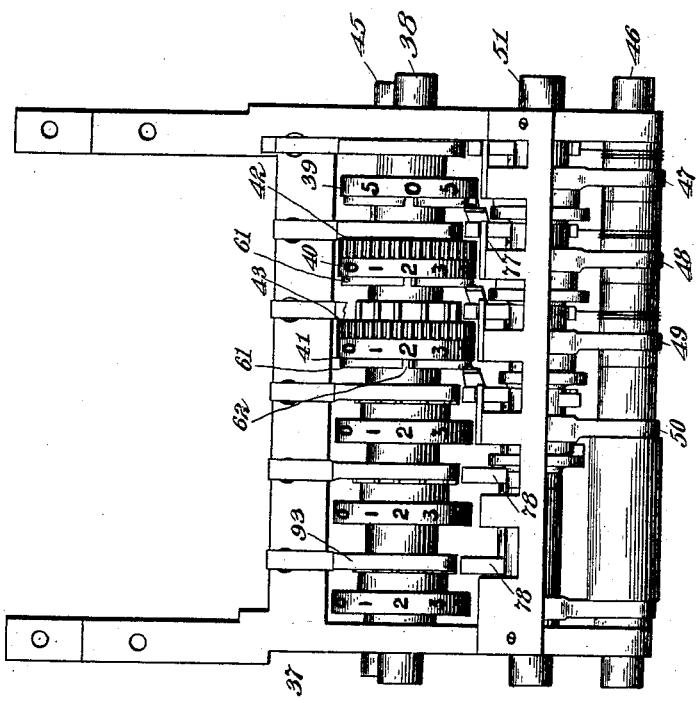
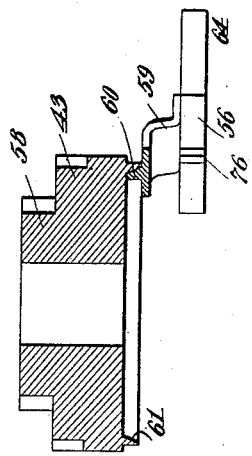
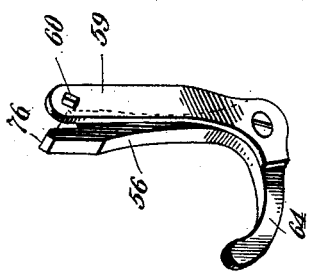
WITNESSES
INVENTOR
Francis C. Osborn
by Rich. N. Dyer
ATT'Y.

No. 715,850. Patented Dec. 16, 1902.
F. C. OSBORN.
CASH REGISTER.
(Application filed Jan. 31, 1899.)
(No Model.) 10 Sheets—Sheet 6.
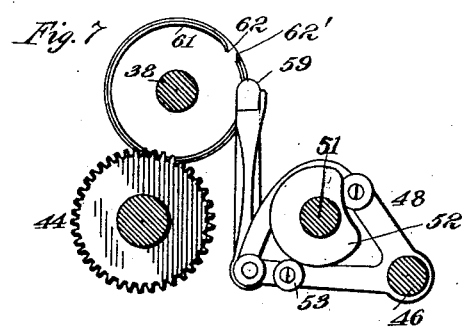
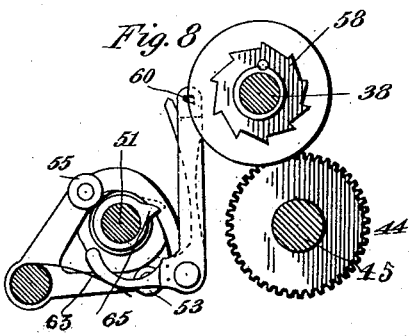
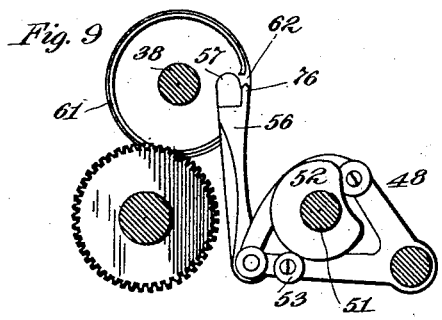
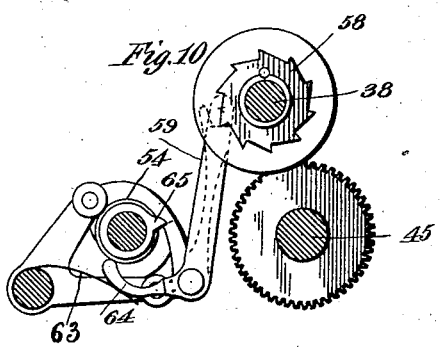
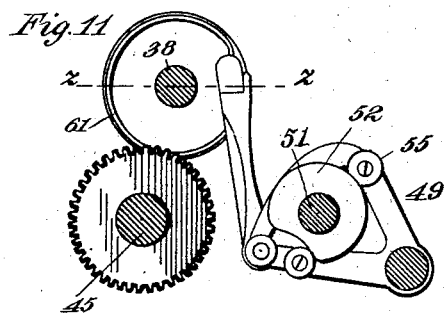
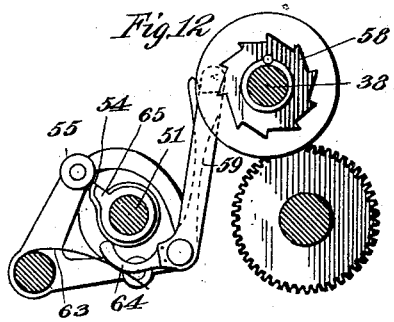
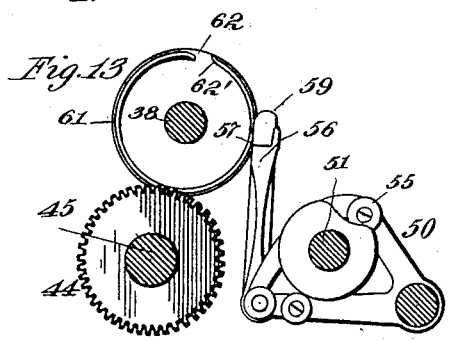
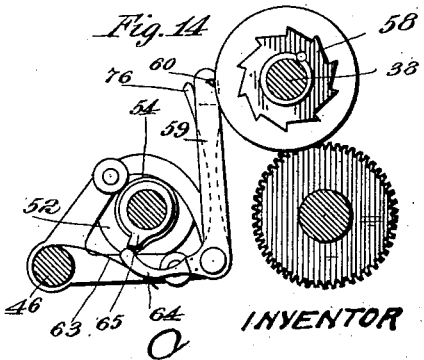
WITNESSES
INVENTOR
Francis C. Osborn
by Rich N. Dyer
ATT'Y No. 715,850. Patented Dec. 16, 1902.
F. C. OSBORN.
CASH REGISTER.
(Application filed Jan. 31, 1899.)
(No Model.) 10 Sheets—Sheet 7.

WITNESSES
Archibald G. Reese
Jno. R. Taylor

INVENTOR
Francis C. Osborn
By Rich. N. Dyer
ATT'Y.

No. 715,850. Patented Dec. 16, 1902.
F. C. OSBORN.
CASH REGISTER.
(Application filed Jan. 31, 1899.)
(No Model.) 10 Sheets—Sheet 8.

Witnesses:
Jas. T. Coleman
Jno. A. Taylor

Inventor
Francis C. Osborn
by Dyer Edmund & Dyer
Att'ys.

THE NORRIS PETERS CO., PHOTO-LITHO., WASHINGTON, D. C.

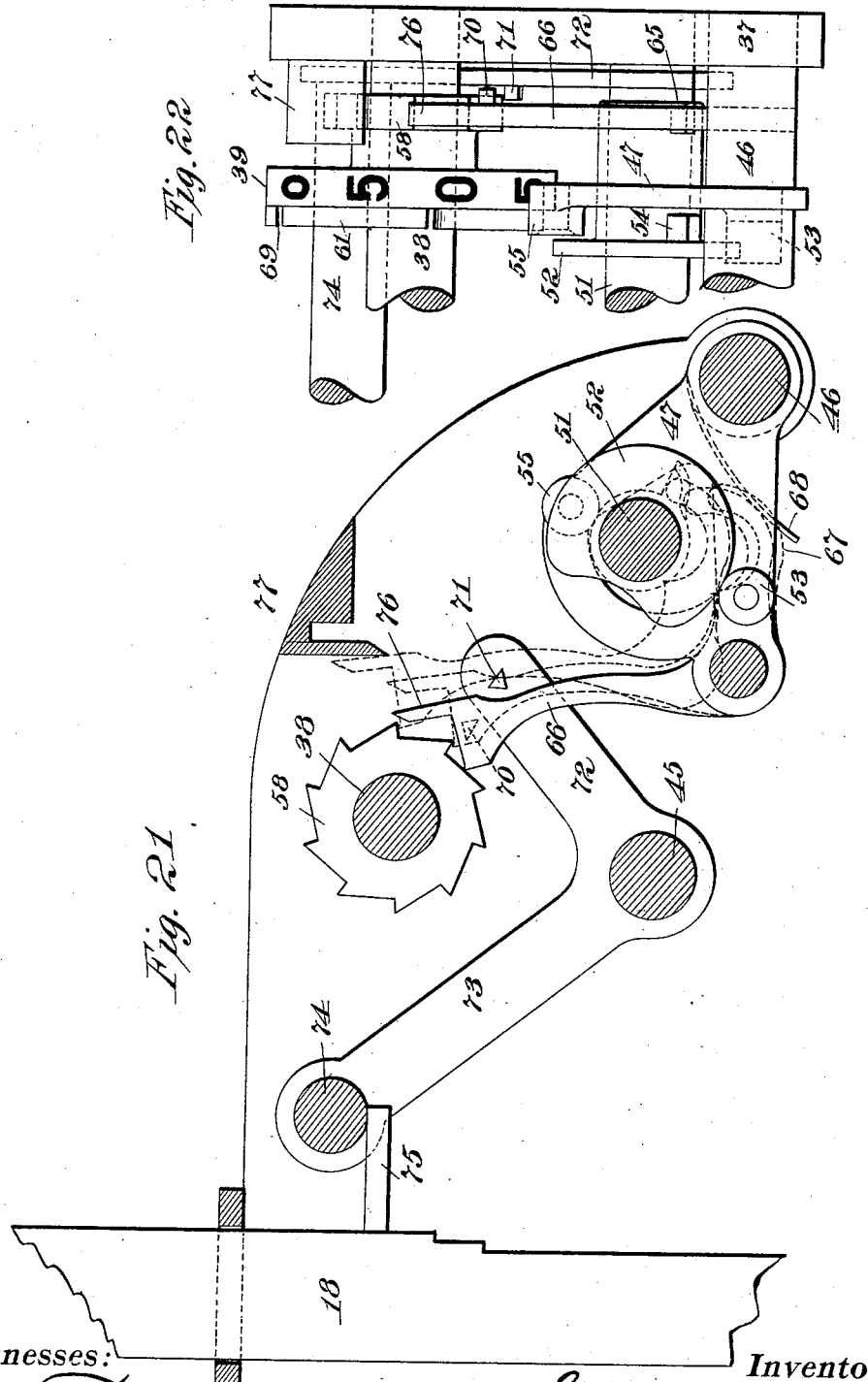

No. 715,850. Patented Dec. 16, 1902.
F. C. OSBORN.
CASH REGISTER.
(Application filed Jan. 31, 1899.)
(No Model.) 10 Sheets—Sheet 10.
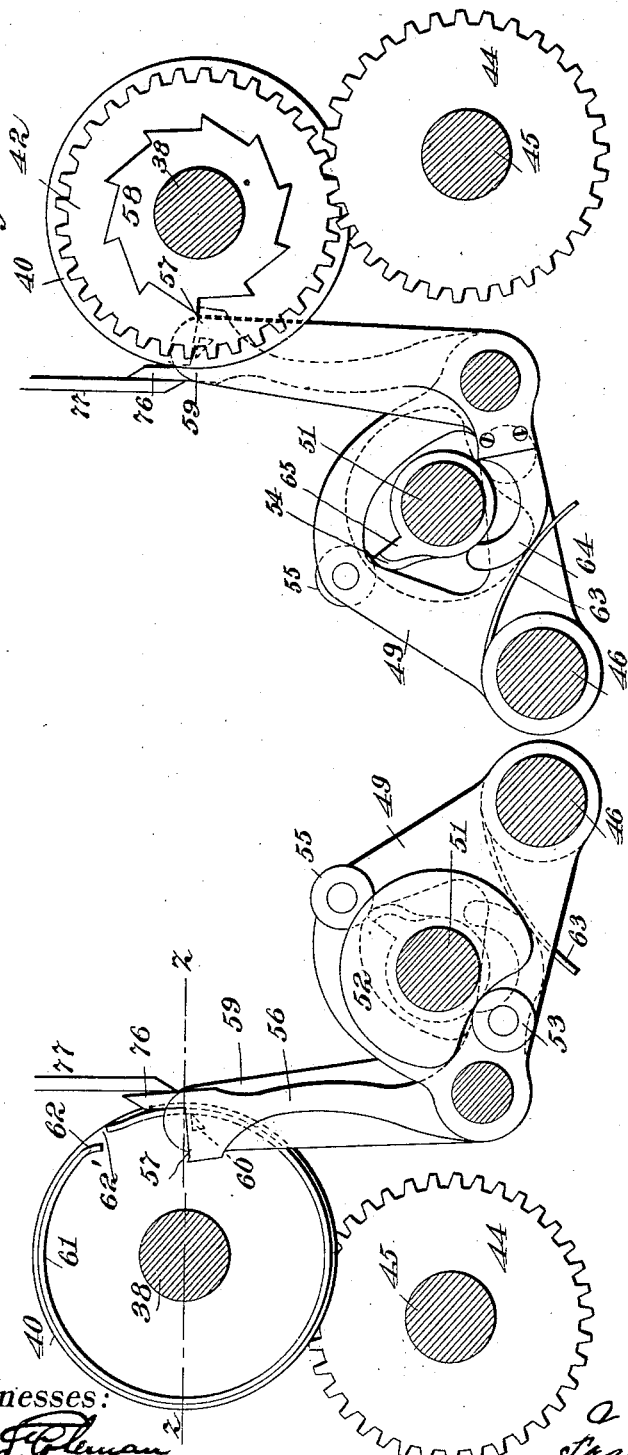
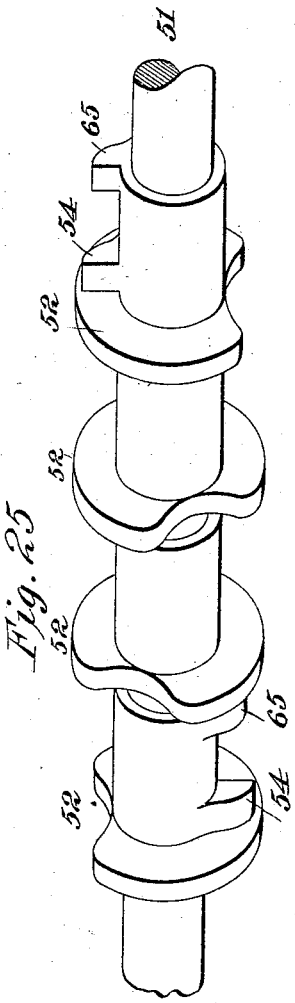
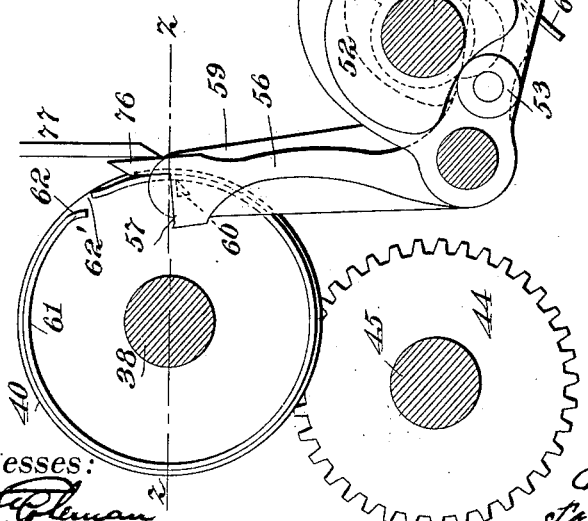
Witnesses: Inventor
Francis C. Osborn
by Dyer Edmonds & Dyer
Att'ys.

UNITED STATES PATENT OFFICE.

FRANCIS C. OSBORN, OF DETROIT, MICHIGAN, ASSIGNOR, BY MESNE ASSIGNMENTS, TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 715,850, dated December 16, 1902.

Application filed January 31, 1899. Serial No. 704,009. (No model.)

*To all whom it may concern:*

Be it known that I, FRANCIS C. OSBORN, a citizen of the United States, residing at Detroit, in the county of Wayne and State of Michigan, have invented certain new and useful Improvements in Cash-Registers, of which the following is a specification.

My invention relates to various new and useful improvements in cash-registers of the type adapted for the registration of sales in amounts of five cents or multiples thereof or equivalent operations with foreign currencies.

The object of the invention is to improve the efficiency of such machines and simplify their construction.

The improvements relate especially to the registering mechanism; but there are other important features of the invention which are of use when the improved register is employed in connection with apparatus of the type invented by me and described in various Letters Patent of the United States.

With a cash-register of the Osborn type a stationary till is employed, having a movable cover. The depression of a key results in the unlocking of the cover, which can then be opened either by a direct-connected bar or by a bar which actuates a trip for the cover near the completion of its positive movement. With apparatus of this type the movement of the actuating-bar, whether it carries the cover positively with it or not, results in the elevation of the proper tablet-rod for exposing the desired sale. The exposed tablet or tablets may be dropped upon the depression of a key or upon the movement of the cover or upon the preliminary movement of the actuating-bar, as may be considered desirable.

In applying the present improvements to a cash-register of the Osborn type, as is preferable, I arrange the keys in banks, the first bank containing the five-cent key, the second bank containing keys representing amounts in multiples of five cents from ten cents to ninety-five cents, inclusive, and the third bank representing amounts in multiples of one dollar. A series of tablets or indicators corresponding to the keys and similarly arranged and marked are mounted in operative connection with the keys. Carried in the frame of the register are a series of register wheels or disks, having on their peripheries the proper numerals. With a five-cent register the periphery of the first disk will carry the figures "0," "5," "0," "5," "0," "5," &c., while the other disks will in each case carry the nine digits and the naught, as is usual. The tens-disk and the hundreds will be connected in any suitable way, such as by a toothed segment, each with its proper lifting-frame, to which the desired graduated movement is given. These lifting-frames are preferably actuated by means of lugs or fingers carried on the different tablet-bars and spaced at the proper distances apart, so as to engage the corresponding lifting-frame at the desired moment to result in the proper registration. The five-cent key in a five-cent machine does not connect with any lifting-frame; but in the preferred construction its operation results merely in the setting of a pawl for operating the five-cent disk, so that on the negative stroke the said disk will be advanced one step. The connection which is thus brought into play by the operation of the five-cent key is also adapted to be actuated by the keys representing values in odd multiples of five cents, such as the fifteen-cent key, the twenty-five-cent key, the thirty-five-cent key, &c. A carrying-pawl of novel construction is used for carrying to the tens, hundreds, and higher disks, although it will be possible, and in some instances desirable, to make use of the ordinary deep-toothed-pawl arrangement for carrying to the highest or the two highest disks. When the keys which represent amounts in odd multiples of five are arranged to directly or indirectly control the mechanism for allowing the actuation of the operating-pawl for the five-cent disk, as preferred, the lifting-frame, which is operated by the keys representing values from ten cents to ninety-five cents, inclusive, will be adapted to be moved to the same extent by the fifteen-cent key as by the ten-cent key, by the twenty-five-cent key as by the twenty-cent key, by the thirty-five-cent key as by the thirty-cent key, &c., whereby the tens-disks will be similarly moved by either pair of keys, while the five-cent disk will be moved only by the key of each pair representing a value in an odd multiple of five. This makes a very simple and effective construction. The several carrying-pawls and also the pawl for operating the five-cent wheel are moved by any suitable arrangement of cams, operated, preferably on the negative stroke of the machine, through any convenient mechanical connections. When used with a cash-register of the Osborn type, the cams are preferably carried on a single cam-shaft, which is given a complete rotation during the closing movement of the till-cover.

While my improvements are especially adapted for use in connection with cash-registers of the Osborn type, they are nevertheless capable of being employed with other forms of cash-registers or analogous mechanical computing or registering machines.

In order that my invention may be better understood, I have illustrated in the accompanying drawings the preferred construction and arrangement of the parts constituting the present improvements, and for purposes of illustration I have shown these improvements as being applied to a cash-register having the characteristics invented by me.

Figure 2:
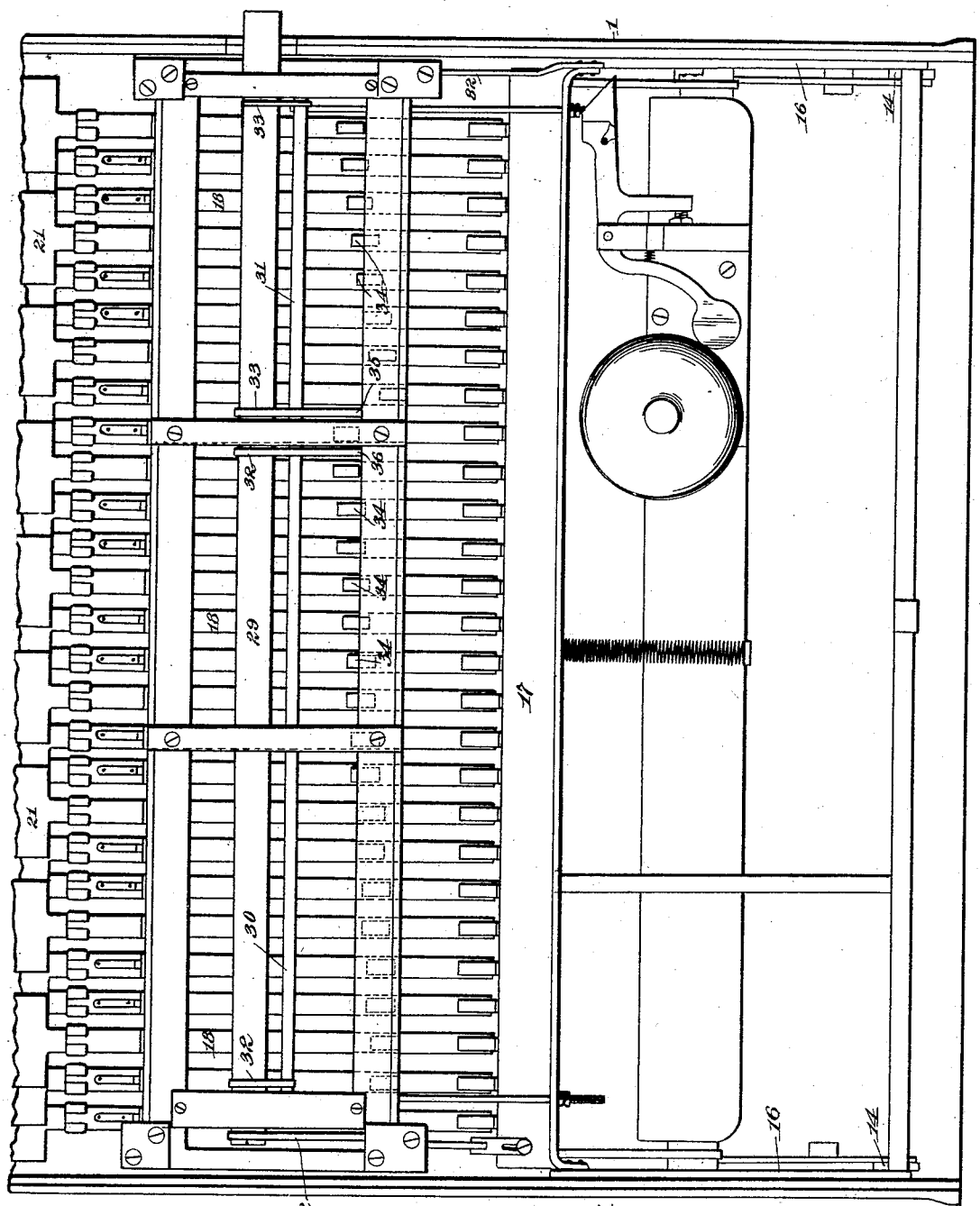
Figure 3:
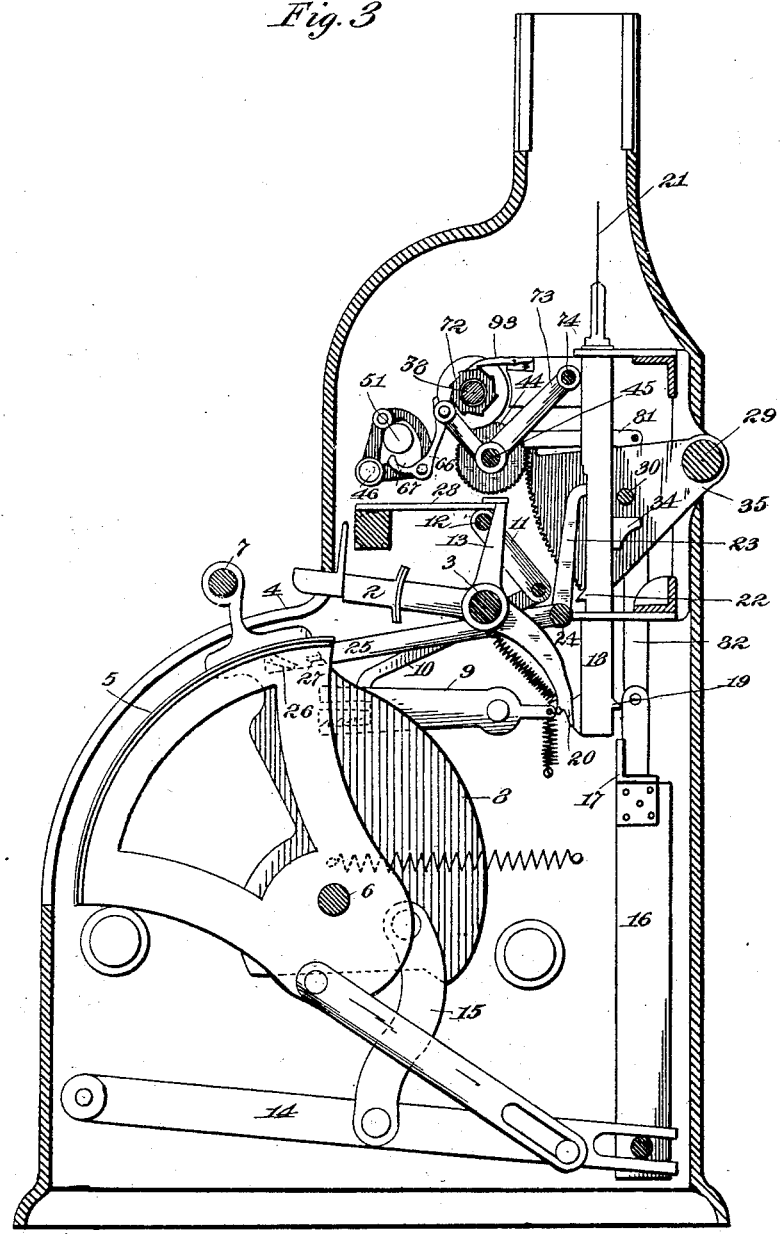
Figure 17:
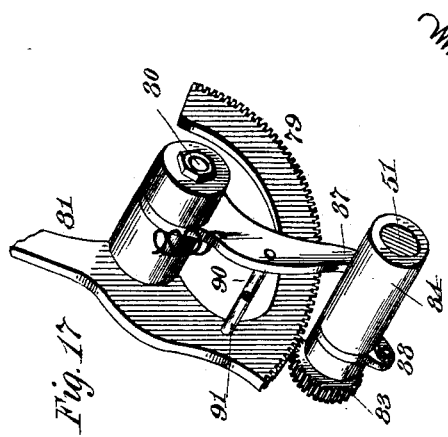
Figure 18:
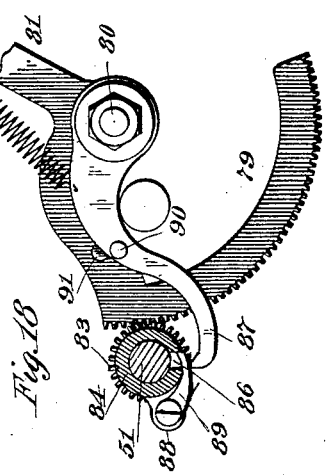
Figure 16:
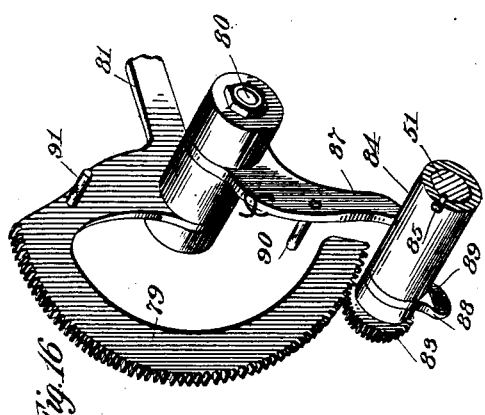
Figure 19:
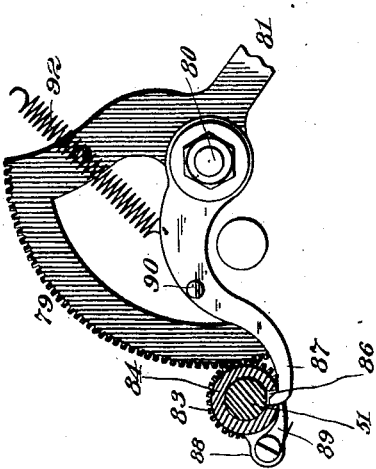
Figure 20:
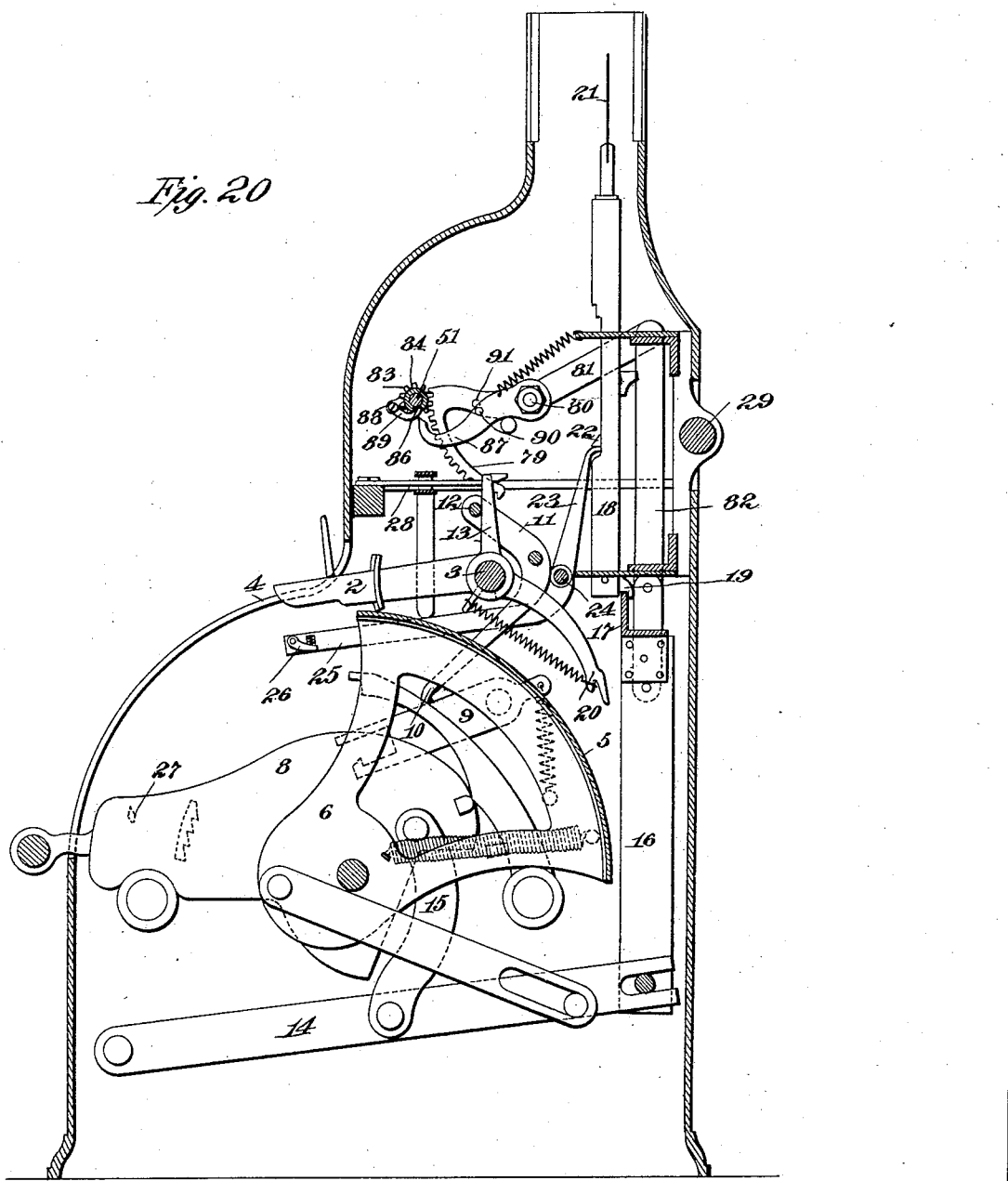

In the drawings, Figure 1 is a horizontal section taken through the tablet-bars immediately below the tablets; Fig. 2, a rear elevation; Fig. 3, a section on the line $y\,y$ of Fig. 1; Fig. 4, a section on the line $x\,x$ of Fig. 1, on an enlarged scale; Fig. 5, a detached plan of the register and its adjacent parts; Fig. 6, a separate perspective view of one of the carrying-pawls, to be described; Figs. 7 to 14, inclusive, detail views illustrating the parts of the register in different positions, Figs. 7, 9, 11, and 13 representing the parts in the same position as in Figs. 8, 10, 12, and 14, but viewed from opposite sides; Fig. 15, a section taken on the line $z\,z$ of Fig. 11; Figs. 16 to 19, inclusive, detail views illustrating the preferred arrangement of parts for operating the cam-shaft; Fig. 20, a section similar to Fig. 3, illustrating the cover open and a tablet elevated and showing the operating mechanism for the cam-shaft; Fig. 21, an enlarged sectional view showing the operating-pawl for the five-cent wheel with its actuating and controlling mechanism, the pawl being illustrated as being tripped and showing in dotted lines its movement to its full throw; Fig. 22, a front view of the devices shown in Fig. 21; Fig. 23, a vertical section showing the operating-pawl of the hundreds-disk with its spring-arm coöperating with the tens-disk to effect a carrying operation; Fig. 24, a corresponding view looking in the other direction, showing the face of the tens-disk with the operating-pawl of the hundreds-disk beyond it; Fig. 25, a perspective view of the cam-shaft, showing the cams thereon and illustrating the preferred arrangement thereof; and Fig. 26 represents an enlarged detail perspective view of the three-pronged pawl for effecting the transfers to the three upper counter-wheels.

In all of the views corresponding parts are represented by the same numerals of reference.

The frame 1 of the apparatus is made in any suitable way. Mounted in this frame are the keys 2 2. These keys are arranged in three banks, (with an apparatus of the capacity shown,) the first bank comprising the five-cent key, the second bank comprising the keys representing values from ten to ninety-five cents, inclusive, and the third bank representing the dollar-key and the multiples thereof. These keys are pivoted on a rod 3 and project through slots in the front 4 of the register. With an apparatus of the type shown a movable till-cover 5 is employed, pivoted at 6. This till-cover may be operated directly by a bar 7, or the said bar may actuate a trip for the cover near the completion of the movement of said bar, in which latter case the cover will be opened by a spring or weight. In the specific instance shown the bar 7 connects at each side with segments 8, mounted on the pivots 6 and normally locked by a toothed bar 9, as is common. This bar is moved downward to release the pivoted segments 8 by a bell-crank arm 10, pivoted upon a suitable transverse shaft carrying a bell-crank 11. A bar 12 connects with the bell-crank 11 and extends in front of all of the arms 13 of the keys 2, so that upon the depression of any one of said keys the arm 13 will move the bar 12 to release the pivoted segments 8. When the segments 8 are released, the bar 7 can be then moved downward, and near the completion of its movement a latch (not shown) for the till-cover will be tripped. I do not claim the specific construction herein, as it is claimed in my application for Letters Patent filed March 6, 1899, Serial No. 707,872. A suitable locking-pawl is used (not shown) for the purpose of preventing return movement of the handle 7 before it has made a complete stroke. The movement of the segments or plates 8 elevates the side levers 14 through the links 15 and elevates the slides 16, carrying the tablet-lifting bar 17. The tablet-bars 18 are mounted directly in front of this bar, and each is provided with a foot 19, adapted to be moved out into the path of the tablet-lifting bar by the curved lower end 20 of its respective key. The tablet-bars 18 carry tablets 21 at their upper ends. Each tablet-bar is also provided with a projection 22, which engages beneath an arm or plate 23, mounted on a bar or pivot 24, so as to hold any tablet or tablets in an elevated position. The releasing arms or plates 23 are tripped for the purpose of dropping the tablets in any suitable way, either upon the depression of a key, upon the movement of the till-cover, or the preliminary movement of the bar 7. The latter construction is illustrated.

The bar 24 is provided with an arm 25, having a latch 26, which is adapted to be tripped by a stud 27, carried on one or both of the swinging plates or segments 8. This construction is described and claimed in my application for Letters Patent filed November 18, 1898, Serial No. 696,760, and I do not claim the same herein. If desired, the arms 13 on the keys may be trapped when the key is depressed by any suitable locking device, such as the pivoted plates 28. This construction of trapping device is also described and claimed specifically by me in my application first above referred to.

Mounted in the back of the apparatus on a rod 29 are the lifting-frames 30 and 31, respectively, each frame comprising two arms 32 32 and 33 33 and the connecting-bar. The lifting-frames 30 and 31 are adapted to be engaged by fingers or lugs 34, carried on the different tablet-bars 18. With the preferred construction of apparatus the fingers 34 on the ten and fifteen cent bars are arranged in the same plane, those on the twenty and twenty-five cent bars in the same but higher plane, those on the thirty and thirty-five cent bars in the same but higher plane, and so on. The lifting-frames 30 and 31 are connected to segments 36 and 35, respectively, so that upon the elevation of either of said lifting-frames the corresponding segment will be moved to an extent dependent upon the tablet-rod which is elevated.

In my application for Letters Patent first above referred to I describe in detail and claim specifically all the features of construction which have been above described, with the exception that in said application the lugs 34 on the tablet-bars in the same bank are all arranged in different planes. I describe these features of construction in the present case only in very general language and simply for the purpose of enabling the construction and operation of the register proper to be fully understood.

The register proper is carried in the frame 37, secured within the framework of the machine immediately above the keys. 38 is a shaft mounted in this frame carrying the number-disks 39 40 41, &c., thereon, representing, respectively, fives, tens, hundreds, &c. On the disk 39 the numerals "0," "5," "0," "5," "0," "5," &c., are placed, while on the succeeding disks the naught and the nine digits are carried. The tens and hundreds disks 40 and 41 carry gear-wheels 42 and 43, which are driven by gears 44 44, mounted on the shaft 45, and with which the segments 35 and 36 engage.

46 is a stationary bar mounted in the frame 37 and on which are pivoted a series of pawl-carrying frames 47, 48, 49, and 50. Each of these frames comprises an essentially angular framework surrounding a shaft 51, on which the operating-cams are mounted. One of these cams 52 for each pawl-carrying frame is essentially circular with a cut-away portion in its periphery, and engaging with this cam is a roller 53, mounted on the pawl-carrying frame. Adjacent to each cam 52 is a cam 54, adapted to engage a roller 55, also mounted on said pawl-carrying frame. The cam 54 engages the roller 55 as the roller 53 enters the cut-away portion of the cam 52. By means of these cams it will be seen that the rotation of the shaft 51 will give a complete up-and-down movement to the pawl-carrying frame. Each pawl-carrying frame is operated by two cams arranged as described. Mounted on each pawl-carrying frame and at the end thereof is a pawl 56, having a tooth 57 in its upper end which engages the ratchet-wheel 58 on the disk which it is to move. In order to carry from the five-cent disk to the tens, from the tens to the hundreds, and from the hundreds to the disks of higher denominations, I provide each carrying-pawl 56 with a resilient arm 59. (Shown particularly in Fig. 6.) Each resilient arm is provided near its upper end with a lug 60 thereon, the upper surface of which lug is beveled, as shown. (See Fig. 15.) Each disk of lower order with which the carrying-pawls coöperate is provided with a rim 61, on the outside of which the lug 60 engages. Each of these rims is beveled on its inner surface, as shown in Fig. 15. The tens, hundreds, and any succeeding disks that may be employed for effecting the carrying operation by means of a carrying-pawl having a resilient arm, as described, are each provided with a notch or cut-away portion 62 in the rim 61 thereof, which notch or cut-away portion is adapted to register with the lug 60 of the coöperating carrying-pawl when the said disk discloses the naught in its rotation, thereby allowing the lug 60 to enter the said opening in the rim to engage the ratchet-wheel 58 for the disk of the next higher order. In order to cause the lug 60 to thus enter the opening 62, I provide the opening at its bottom with a slightly-outturned end 62'. (Shown particularly in Figs. 7, 13, and 23.) The carrying-pawls are forced into this opening by means of springs 63, engaging beneath a tail 64 on each carrying-pawl. The carrying-pawls after they have effected the carrying operation are returned to their normal positions, with the lug 60 resting on the outside of the rim 61 of the adjacent disk of lower order, by means of a cam 65, carried by the cam-shaft 51, which cam engages the tail 64 of the carrying-pawl to move the same against the tension of the spring 63.

In order to actuate the five-cent disk, a single pawl 66 (see Figs. 4, 21, and 22) is employed for operating the ratchet-wheel for that disk, which pawl is not provided with a resilient arm, as explained, since it does not perform a carrying operation. The pawl 66 is mounted on the pawl-carrying frame 47 and is operated by cams, as is the case with the carrying-pawls already described. It is also provided with a tail 67, with which a spring 68 engages, tending to normally force the tooth of the pawl 66 into engagement with the ratchet-wheel for the five-cent disk. The rim 61 of the five-cent disk is provided with a series of cut-away portions 69 (see Figs. 4 and 22) therein, adapted to be brought into coincidence with the lug 60 of the carrying-pawl for the tens-disk whenever the naught is disclosed on the five-cent disk. With the carrying-pawl for the hundreds and succeeding disks the rim with which the lug 60 of each of said pawls coöperates is provided with only a single cut-away portion, as explained, since there is only a single naught on the disk which controls the carrying operation performed by such pawls. The carrying-pawl for the tens-disk is operated by the frame 48 thereof, as will be understood, and the resilient arm 59 of said carrying-pawl coöperates with the notched rim of the five-cent disk. The carrying-pawl for the hundreds-disk is operated by the frame 49 thereof, and its resilient arm coöperates with the notched rim of the tens-disk, &c. Thus it will be seen that the frame 47, which operates the five-cent pawl, is not provided with a carrying-pawl, in which respect it differs from the other frames. The pawl 66 for the five-cent disk is normally maintained out of engagement with its ratchet-wheel and against the tension of the spring 68, but is adapted to be engaged with said ratchet-wheel whenever a five-cent sale or a sale representing an odd multiple of five cents is made. This operation is preferably performed through the intermediation of the five-cent tablet-bar and the tablet-bars representing odd multiples of five. To this end I provide the pawl 66 with an inclined stud 70 thereon, with which a stud 71 engages. The stud 71 is mounted on an arm 72, pivoted on the shaft 45 and having a bell-crank 73, which carries a bar 74 at its upper end. The bar 74 extends parallel of the tablet-rods for all the keys representing values from five to ninety-five cents, inclusive. The five-cent tablet-rod and the tablet-rods representing values in odd multiples of five—fifteen, twenty-five, thirty-five, forty-five, fifty-five, sixty-five, seventy-five, eighty-five, and ninety-five—are each provided with a pin 75 thereon, adapted to engage the bar 74 near the completion of the upstroke of the tablet-rods, which engagement oscillates the arm 72, disengaging the studs 71 and 70, and allowing the spring 68 to force the pawl 66 into engagement with the ratchet-wheel for the five-cent disk. The pawl 66 and the carrying-pawls are each provided at their upper ends with a finger 76, adapted to engage normally in front of a plate 77, one for each pawl. Each plate 77 is provided with a sharpened lower edge, as shown. When the pawl 66 or one of the carrying-pawls is tripped for operating the ratchet-wheel of the respective disk, the finger 76 thereof will when the pawl is elevated engage behind the respective plate 77 and be held tightly in contact with its respective ratchet-wheel. By reason of this engagement overthrow of the register-disk will be prevented, since the respective pawls will be practically locked to the ratchet-wheels of said register-disks.

In carrying from the five-cent to the tens disk, from the tens to the hundreds, and from the hundreds to the thousands I prefer to make use of carrying-pawls having resilient arms, as I have explained. In carrying from the thousands to the tens-of-thousands and from the tens-of-thousands to the hundreds-of-thousands disks or to any less or greater number of disks a similar arrangement of carrying-pawls may be used. I prefer, however, to make use of the ordinary deep-toothed arrangement of carrying-pawls 78, operated from the carrying-pawl for the thousands-disk, as shown in Figs. 5 and 26. This deep-toothed arrangement of carrying-pawls is so common in the art that it need not be described or illustrated specifically.

In order to operate the cam-shaft 51 to actuate the several pawls of the register-disks, it is necessary with the arrangement shown to give to said shaft at least a single complete rotation during the negative stroke of the machine, since with the positive stroke the tens-disk or the hundreds-disk is operated directly through the toothed segment 35 or 36. A convenient scheme for effecting this movement in the specific machine illustrated is by connections operated from the tablet-lifting bar 17. To effect this, I employ a toothed segment 79, mounted on a stub-shaft 80, secured to one of the side frames of the machine. The segment 79 is provided with an arm 81, which is connected to the tablet-elevating bar at one side by a connecting-rod 82. (See Fig. 20.) At each complete operation of the machine, therefore, the arm 81 will be moved first upward and then downward. The toothed segment 79 meshes with a pinion 83, the relation of movement of the parts being such that the arm in moving upward will give the pinion 83 at least one turn and in moving downward will return the pinion 83 to its former position. The pinion 83 is mounted loosely on the end of the cam-shaft 51. The said cam-shaft carries a collar 84, which is rigidly secured to said shaft by a pin 85. The collar 84 is provided with a slot 86 therein, with which a latch 87 normally engages to prevent rotation of the cam-shaft. The latch 87 is preferably pivoted on the stub-shaft 80. The pinion 83 in rotating carries an arm 88 with it, on which arm is mounted a spring-pressed pawl 89, adapted to engage the slot 86 when the pinion 83 has been turned to its extreme forward position by the upward stroke of the tablet-elevating bar. In order to disengage the latch 87 from the slot 86 to permit the return movement of the pinion 83 to give the cam-shaft a complete rotation when the tablet-elevating bar moves downward, I provide the latch 87 with a pin 90 thereon, with which a pin 91 on the segment 79 engages near the completion of the positive stroke of said segment.

The operation of the specific embodiment of my invention which I have thus described will be as follows: Assuming that a sale of ten cents is made, the corresponding key 2 is depressed. This operates the bar 12 to release the latch 9 from the plates or segments 8, so that the bar 7 can be now moved downward. The depression of the key also moves the toe 19 of the proper tablet-rod outward into the path of movement of the tablet-elevating bar 17. By now moving the bar 7 downward the till-cover 5 will be opened, either by the direct movement of said bar or by being released near the completion of the movement of said bar, as I describe in my said application first above referred to. This movement of the handle downward elevates the tablet-lifting bar 17, which moves the ten-cent tablet to its elevated position. At the same time or by the depression of the key itself any exposed tablets will be dropped by suitable mechanism familiar in the art. The elevation of the tablet-rod causes, near the completion of the upstroke thereof, the lug 34 to engage the bar of the proper tilting frame, which moves the rack 35 to the desired extent, causing a positive rotation of the tens-disk 40 of one step, disclosing the succeeding figure, thus adding to the amount disclosed by the register a sum equal to ten units. If it be assumed that at the time the sale of ten cents is made the register on its tens and units disks indicates "95," it will be seen that the tens-disk in being thus moved one step will present the cut-away portion 62 of its rim to the lug 60 of the carrying-pawl for the hundreds-disk. This allows the carrying-pawl for the hundreds-disk to be forced inward by the spring 63 into engagement with the ratchet-wheel of the hundreds-disk. The tablet-elevating bar 17 in moving upward, as explained, will therefore have tilted the arm 81 to move the toothed segment 79, and the pinion 83 will have moved a complete rotation. The segment 79, near the completion of its stroke, will cause the pin 91 to engage the pin 90 to release the latch 87 from the slot 86 to free the cam-shaft. The complete rotation given to the pinion 83 will cause the pawl 89 thereof to engage the slot 86. Upon the return stroke of the bar 7 the tablet-elevating bar 17 will be moved downward, returning the toothed segment 79 to its normal position, and the return movement of the pinion 83 will by the engagement of the pawl 89 with the slot 86 move the cam-shaft a complete turn. As the pins 90 and 91 separate the latch 87 will once more be moved upward by a suitable spring 92; but the toe of said latch will not engage the sleeve 84 until the slot 86 has passed beyond the same. Upon the completion of the rotation given to the cam-shaft the slot 86 will be brought into line with the latch 87, and the latter will once more lock the cam-shaft. The cam-shaft in being thus given a complete rotation will cause all the pawl-carrying frames 47, 48, 49, and 50 to be given a complete up-and-down movement by reason of the engagement of the cams 54 with the rollers 55, the cut-away portion in each cam 52 allowing the roller 53 to be moved up and the cams 52 returning the pawl-carrying frames to their normal positions by the engagement of the active surfaces of said cams 52 with the rollers 53. Preferably the cams 52 and 54 are disposed with respect to the corresponding cams for the other pawls at different distances in the plane of rotation, so that the pawls for the several disks act in succession from lower to higher orders. The object of this is to give a complete total at the end of each complete operation of the machine. Assuming the stud 60 for the hundreds-disk to have passed through the opening 62 in the tens-disk, the said pawl will be in engagement with the ratchet-wheel of the hundreds-disk, and when the pawl-carrying frame 49 is moved up and down the said pawl will feed the hundreds-disk forward one step. Near the completion of the movement of the cam-shaft 51 or at any time after the upstroke of the pawl-carrying frame by the action of the cams 54 the cams 65 engage the tails of any pawls which may have been in engagement with any of the ratchet-wheels, returning the pawls to their normal positions, with the lugs 60 thereof on the outside of the rims 61 of the disks of lower order. It will be understood that if a pawl has not been released by the passage of the lug 60 thereof through the opening 62 in the rim of a disk of lower order the tail of that pawl will not be engaged by the cam 65, or only slightly so, since the pawl will be held away by the engagement of the lug 60 thereof on the outside of the coöperating rim 61.

Heretofore the carrying-pawls in this class of registering mechanism have been returned to the latched position by the registering-wheels themselves. In such construction there is the serious objection of all the registering-wheels receiving a slight movement from the pawls at every operation of the machine, whether the pawls have been tripped or not. The cams 65 in the present construction obviate this unnecessary wear between the pawls and register-wheels.

In Figs. 7 and 8 the pawl-carrying frame is shown in its normal position. In Figs. 9 and 10 the lug 60 of the pawl 56 shown has passed through the opening 62 in the rim 61, allowing the pawl 56 to engage the ratchet-wheel 58 of the disk of higher order, Fig. 10. In Figs. 11 and 12 the cam-shaft is partly turned, bringing the cut-away portion of the cam 52, Fig. 11, into coincidence with the roller 53, and the cam 54, Fig. 12, engaging the roller 55 to elevate the pawl-carrying frame and move the ratchet-wheel 58 one step. In Figs. 13 and 14 the cam 65 has engaged the tail 64 of the pawl, returning it to its normal position, with the lug 60 on the outside of the rim 61. This movement of the lug 60 from the inside to the outside of the rim 61 is made possible by reason of the inclined surfaces of the said lug and of the interior of the rim and by reason of the elastic character of the arms 59.

When a sale of five cents or an odd multiple of five is made, the depression of the proper key results, by the operation of the bar 7, in the elevation of one of the tablet-rods, having a pin 75 thereon. This tablet-rod in being elevated moves the bar 74 to disengage the studs 70 and 71. The spring 68 now moves the pawl 66 into engagement with the ratchet-wheel of the five-cent disk 39. Upon the operation of the cam-shaft 51 and the swinging of the pawl-carrying frame 47 the pawl 66 will move the five-cent disk one step, and after the pawl has been thus moved it will be reset, as explained, by the engagement of the cam 65 with the tail 67. If a sale other than five cents or an odd multiple of five is made, the elevation of the pawl 66 by the movement of the pawl-carrying frame 47 disengages the lugs 70 and 71; but before the spring 68 can force the pawl 66 in contact with the ratchet-wheel for the five-cent disk the finger 76 on the pawl 66 will engage in front of the plate 77 to maintain the pawl 66 out of engagement with its ratchet-wheel. By thus actuating the five-cent disk upon the negative stroke of the machine it becomes possible to materially simplify the construction. Since the studs 34 of the ten and fifteen cent keys are arranged in the same plane and of the twenty and twenty five cent keys in the same but higher plane, &c., as explained, the depression of the fifteen-cent key, for example, results in the same movement of the tens-disk as when the ten-cent key is depressed; but the depression of the fifteen-cent key also results in the tripping of the pawl 66 for the five-cent disk, so that the latter disk will be advanced one step. The ratchet-wheels for the disks are provided with the usual pawls 93 for preventing return stroke thereof, as is common. They are also provided with any suitable mechanism for returning them to zero when desired.

For purposes of convenience of expression I have heretofore designated the several keys as representing five cents and multiples thereof. More correctly speaking, the keys represent integers and fractions, in which the tens are the integers and the five cents the fractional part thereof, or, in other words, fifteen in this case is in reality ten and a half, and so on. Bearing this fact in mind, the application of this feature of my invention to the moneys of other countries will be obvious. For example, in its application to the money of Great Britain the half-penny would be treated the same as the five cents in United States currency—that is, a keyboard will be arranged to register one-half penny, one penny, one and one-half pence, and so on. The half-penny bar with British currency will therefore correspond exactly with the five-cent bar with United States currency and will result in the actuation of the half-penny register when a key representing an odd multiple of one-half is operated, as the one and one-half, two and one-half, three and one-half pence, &c.

Having now described my invention, what I claim as new, and desire to secure by Letters Patent, is as follows:

1. In a cash-register, a registering mechanism, a series of intermediate actuators therefor representing integers and parts thereof, a series of selective keys for said actuators, and a primary actuator adapted to positively move the said intermediate actuators when set for operation, the said intermediate actuators for integers being arranged to actuate the registering mechanism upon the positive stroke of said primary actuator, and the intermediate actuator for the lowest fraction being arranged to actuate the registering mechanism on the negative stroke of said primary actuator, substantially as set forth.

2. In a cash-register, a registering mechanism, a series of intermediate actuators therefor representing integers and parts thereof, a series of selective keys for said actuators, and a primary actuator adapted to positively move the said intermediate actuators when set for operation, all of said intermediate actuators above the one representing the lowest fraction being arranged to actuate the registering mechanism upon the positive stroke of said primary actuator, and the intermediate actuator for the lowest fraction being arranged to actuate the registering mechanism on the negative stroke of said primary actuator, substantially as set forth.

3. In a cash-register, a registering mechanism, a series of intermediate actuators therefor representing five cents and multiples thereof, a series of selective keys for said actuators, and a primary actuator adapted to positively move the said intermediate actuators when set for operation, all of said intermediate actuators above that representing five cents being arranged to actuate the registering mechanism upon the positive stroke of the primary actuator, and the five-cent intermediate actuator being arranged to actuate the registering mechanism on the negative stroke of said primary actuator, substantially as set forth.

4. In a cash-register, a registering mechanism, a series of intermediate actuators therefor representing five cents and multiples thereof, a series of selective keys for said intermediate actuators, and a primary actuator adapted to positively move the said intermediate actuators when set for operation, all of the said intermediate actuators above the one representing five cents being arranged to actuate the said registering mechanism for all amounts representing the even multiples of five cents upon the positive stroke of said primary actuator, and the five-cent intermediate actuator being arranged to actuate the registering mechanism for five-cent amounts upon its negative stroke, substantially as set forth.

5. In a cash-register, a registering mechanism, a series of intermediate actuators therefor representing five cents, and odd and even multiples thereof, a series of selective keys for said actuators, and a primary actuator adapted to move the said intermediate actuators, said intermediate actuators above the one representing five cents being arranged to actuate the registering mechanism to register amounts which are even multiples of five cents, upon the positive stroke of said primary actuators, and the five-cent intermediate actuator being arranged to actuate said registering mechanism for five cents upon the negative stroke of said primary actuator, substantially as set forth.

6. In a cash-register, a registering mechanism, a series of intermediate actuators therefor representing five cents, and odd and even multiples thereof, a series of selective keys for said actuators, and a primary actuator adapted to move the said intermediate actuators, said intermediate actuators being arranged to actuate registering mechanism to register amounts which are even multiples of five cents, upon the positive stroke of said primary actuator, and to actuate the registering mechanism for the fives of amounts which are odd multiples of five cents above the first power upon the negative stroke of said primary actuator, substantially as set forth.

7. In a cash-register, a registering mechanism, a series of intermediate actuators therefor representing five cents, and odd and even multiples thereof, a series of selective keys for said actuators, and a primary actuator adapted to move the said intermediate actuators, the said intermediate actuators being arranged to actuate the registering mechanism to register amounts which are even multiples of five cents upon the positive stroke of said primary actuator, and to actuate the registering mechanism to register five cents and the fives of amounts which are odd multiples of five cents upon the negative stroke of said primary actuator, substantially as set forth.

8. In a cash-register, the combination with a register, of a pawl for operating the same, and a stationary locking-plate located adjacent to the pawl and adapted to hold the same positively either in or out of engagement with the register when said pawl is actuated.

9. In a cash-register, the combination with a register, of a pawl for operating the same, a movable latch for holding the pawl normally out of operative position and a stationary locking-plate for holding the pawl out of operative position after said pawl is moved out of connection with the latch.

10. In a cash-register, the combination with a register, of a pawl for operating the same, a movable latch for holding the pawl normally out of operative position and a stationary locking-plate so located that the pawl may pass to either side of the same and thus be held either in or out of engagement with the register.

11. In a cash-register the combination with adjacent register-disks one of which is provided with a notched cam-flange, a pivoted pawl having a series of graduated arms which coöperate with all the disks except that having the flange, a spring-arm mounted on the pawl and carrying a stud which is arranged to operate both within and without the said flange and means for operating said pawl.

12. In a cash-register, a registering mechanism for registering five cents and multiples thereof, actuating mechanism therefor arranged to actuate the registering mechanism for all amounts above five cents upon the positive movement of said actuating mechanism and also upon the said positive movement to set or prepare an additional element whereby the said actuating mechanism actuates the registering mechanism for five cents upon the negative movement thereof, a series of selective keys for said actuating mechanism, and a primary actuator adapted to move the actuating mechanism, substantially as set forth.

13. In a cash-register, a registering mechanism for registering five cents and multiples thereof, actuating mechanism therefor arranged to actuate the registering mechanism for all even multiples of five cents upon the positive movement of said actuating mechanism, and, also, upon said movement to set or prepare an additional element whereby the said actuating mechanism actuates the registering mechanism for five cents upon the negative movement thereof, a series of selective keys for said actuating mechanism, and a primary actuator adapted to move the actuating mechanism, substantially as set forth.

14. In a cash-register, a registering mechanism for registering five cents and multiples thereof and actuating mechanism therefor arranged to actuate the registering mechanism for all amounts representing even multiples of five cents and the even multiples of five cents of amounts which are odd multiples of five cents upon the positive movement of said actuating mechanism, and, also, upon said positive movement, to set or prepare an additional element whereby the said actuating mechanism actuates the registering mechanism for the odd five of the amounts which are odd multiples of five cents above the first power, upon its negative movement, a series of selective keys for said actuating mechanism, and a primary actuator adapted to move the actuating mechanism, substantially as set forth.

15. In a cash-register, a registering mechanism for registering five cents and multiples thereof, an actuating mechanism therefor arranged to actuate the registering mechanism for all amounts representing even multiples of five cents and the even multiples of five cents of amounts which are odd multiples of five cents upon the positive movement of said actuating mechanism, and, also, upon said positive movement to set or prepare an additional element whereby the said actuating mechanism actuates the registering mechanism for five cents and the odd five of the amounts which are odd multiples of five cents upon the negative movement thereof, a series of selective keys for said actuating mechanism, and a primary actuator adapted to move the actuating mechanism, substantially as set forth.

16. In a cash register and indicator, a series of indicators severally marked: .05, .10, .15, .20, .25, .30, .35, .40, .45, .50, .55, .60, .65, .70, .75, .80, .85, .90, .95, combined with a registering mechanism arranged to register such of these amounts as are even multiples of .05 and the even multiples of fives of amounts which are odd multiples of .05 as the indicators are moved into indicating position, and to register .05 and the odd five of the amounts which are odd multiples of .05 after the indication is completed, a series of selective keys for said actuating mechanism, and a primary actuator adapted to move the actuating mechanism, substantially as set forth.

17. In a cash register and indicator, a series of indicators severally marked: .05, .10, .15, &c., combined with a registering mechanism arranged to register such of these amounts as represent even multiples of .05 and the even multiples of five of amounts which are odd multiples of .05 as the indicators are moved into indicating position, and to register the odd five of amounts which are odd multiples of .05 above the first power, after the indication is completed, a series of selective keys for said actuating mechanism, and a primary actuator adapted to move the actuating mechanism, substantially as set forth.

18. In a cash register and indicator, a series of indicators marked: .05, .10, .15, &c., normally out of indicating position, suitable actuating mechanism to move them into indicating position, and registering mechanism arranged to register the amounts shown on the indicators which are even multiples of five cents and the even multiples of five of amounts which are odd multiples of five cents as the indicators are moved into indicating position, and to register five cents and the odd five of the amounts which are odd multiples of five cents upon return movement of said actuating mechanism, a series of selective keys for said actuating mechanism, and a primary actuator adapted to move the actuating mechanism, substantially as set forth.

19. In a cash register and indicator, a series of indicators marked: .05, .10, .15, &c., normally out of indicating position and suitable actuating mechanism to move them into indicating position, registering mechanism arranged to register amounts shown on the indicators which are even multiples of five cents and the even multiples of five of amounts which are odd multiples of five cents, as the indicators are moved into indicating position, and to register the odd five of the amounts which are odd multiples of five cents above the first power, upon the return movement of said actuating mechanism, a series of selective keys for said actuating mechanism, and a primary actuator adapted to move the actuating mechanism, substantially as set forth.

20. In a cash-register, the combination of two or more registering-disks, transfer mechanism between the disks consisting of pawls arranged to be successively actuated, tripping mechanism for each of said pawls controlled by the next-lower registering-disk, a pawl for actuating the units-disk arranged to be actuated in advance of said transfer-pawls, tripping mechanism for said last-named pawl controlled independently of the registering-disks, and suitable actuating mechanism for said disks and said pawls.

21. In a cash-register, the combination of two or more registering-disks, means for actuating said disks having a positive and a negative stroke, transfer mechanism between the disks consisting of pawls arranged to be successively actuated upon the negative stroke of the means actuating the disks, and a pawl for actuating the units-disk arranged to be actuated also upon the negative stroke of the means actuating the disks, but in advance of said transfer-pawls.

22. In a register, the combination with two adjacent register-disks, of means for moving each of said disks, a carrying-pawl for the disk of higher order, a stud on said pawl, a rim on the disk of lower order with which said stud engages, said rim being provided with an opening therein through which said stud may pass to allow the pawl to engage the disk of higher order, and means for operating said pawl, substantially as set forth.

23. In a register, the combination with two adjacent register-disks, of means for moving each of said disks, a carrying-pawl for the disk of higher order, a stud on said pawl, a rim on the disk of lower order with which said pawl engages, said rim being provided with an opening therein through which said stud may pass to allow the pawl to engage the disk of higher order, means for operating said pawl, and means for resetting said pawl after the operation of the disk of higher order, thereby, substantially as set forth.

24. In a register, the combination with two adjacent register-disks, of means for moving one of said disks, a carrying-pawl for the disk of higher order, a resilient arm carried by said pawl, a stud on said arm, a rim on the disk of lower order with which said stud engages, said rim being provided with an opening therein through which said stud may pass to allow the pawl to engage the disk of higher order, and means for operating said pawl, substantially as set forth.

25. In a register, the combination with two adjacent register-disks, of means for moving one of said disks, a carrying-pawl for the disk of higher order, a resilient arm carried by said pawl, a stud on said arm, a rim on the disk of lower order with which said stud engages, said rim being provided with an opening therein through which said stud may pass to allow the pawl to engage the disk of higher order, means for operating said pawl, and means for withdrawing the pawl to its normal position forcing the stud around the edge of said rim, substantially as set forth.

26. In a register, the combination with two adjacent register-disks, of means for moving each of said disks, a carrying-pawl for the disk of higher order, a stud on said pawl, a rim on the disk of lower order with which said stud engages, said rim being provided with an opening through which said stud may pass to allow the pawl to engage the disk of higher order, an outturned lip on said rim adjacent to the opening, and means for operating said pawl, substantially as set forth.

27. In a register, the combination with two adjacent register-disks, of means for moving each of said disks, a carrying-pawl for the disk of higher order, a stud on said pawl, a rim on the disk of lower order with which said stud engages, said rim being provided with an opening therein through which said stud may pass to allow the pawl to engage the disk of higher order, a cam-shaft, and a cam on said shaft for operating said pawl, substantially as set forth.

28. In a register, the combination with two adjacent register-disks, of means for moving each of said disks, a carrying-pawl for the disk of higher order, a stud on said pawl, a rim on the disk of lower order with which said stud engages, said rim being provided with an opening therein through which said stud may pass to allow the pawl to engage the disk of higher order, a cam-shaft, a cam on said shaft for operating the pawl, and a cam on said shaft for resetting the pawl, substantially as set forth.

29. In a register, the combination with two adjacent register-disks, of a cam-shaft, a cam on said shaft for moving one of said disks, a carrying-pawl for the disk of higher order, a stud on said pawl, a rim on the disk of lower order with which said stud engages, said rim being provided with an opening therein through which said stud may pass to allow the pawl to engage the disk of higher order, and a cam on said shaft for operating said carrying-pawl, substantially as set forth.

30. In a register, the combination with two adjacent register-disks, of a pawl for moving one of said disks, a cam-shaft, a cam for operating said pawl, a cam on said shaft for resetting said pawl, a carrying-pawl for the disk of higher order, a stud on said pawl, a rim on the disk of lower order with which said stud engages, said rim being provided with an opening therein through which said stud may pass to allow the carrying-pawl to engage the disk of higher order, a cam on said shaft for operating said carrying-pawl, and a cam on said shaft for resetting said carrying-pawl, substantially as set forth.

31. In a register, the combination with two adjacent register-disks, of means for moving one of said disks, a carrying-pawl for the disk of higher order, an inclined stud on said pawl, a rim on the disk of lower order with which said stud engages, said rim having an inclined inner edge and being provided with an opening therein through which said stud may pass to allow the pawl to engage the disk of higher order, and means for operating said pawl, substantially as set forth.

32. In a register, the combination with two adjacent register-disks, of means for moving one of said disks, a carrying-pawl for the disk of higher order, an inclined stud, a rim on the disk of lower order with which said stud engages, said rim having an inclined inner surface and being provided with an opening therein through which said stud may pass to allow the pawl to engage the disk of higher order, and means for operating said pawl, substantially as set forth.

33. In a register, the combination with two adjacent register-disks, of means for moving one of said disks, a carrying-pawl for the disk of higher order, a resilient arm on said pawl, an inclined stud on said arm, a rim on the disk of lower order with which said stud engages, said rim having an inclined inner surface and being provided with an opening therein through which said stud may pass to allow the pawl to engage the disk of higher order, and means for operating said pawl, substantially as set forth.

34. In a register, the combination with two adjacent register-disks, of a cam-shaft, a cam on said shaft for moving one of said disks, a carrying-pawl for the disk of higher order, a stud on said pawl, a rim on the disk of lower order with which said stud engages, said rim being provided with an opening therein through which said stud may pass to allow the pawl to engage the disk of higher order, and a cam on said shaft for operating said carrying-pawl, said cams being disposed in different planes of rotation, whereby the register-disks will be moved successively, substantially as set forth.

35. In a register, the combination with two adjacent register-disks, of a pawl for moving one of said disks, a cam-shaft, a cam on said shaft for moving said pawl, a cam on said shaft for resetting said pawl, a carrying-pawl for the disk of higher order, a stud on said pawl, a rim on the disk of lower order with which said stud engages, said rim being provided with an opening therein through which said stud may pass to allow the pawl to engage the disk of higher order, a cam on said shaft for operating said carrying-pawl, and a cam on said shaft for resetting the carrying-pawl, the cams being disposed on the shaft in different planes of rotation, whereby the pawls will be successively operated and successively reset, substantially as set forth.

36. In a register, the combination with a register-disk, of a pawl for operating said disk, a finger on said pawl, and a locking-plate located adjacent to the pawl, the finger being adapted to engage on either side of said locking-plate to lock the pawl positively in engagement or out of engagement with the register-disk, substantially as set forth.

37. In a register, the combination with two adjacent register-disks, of means for moving one of said disks, a carrying-pawl for the disk of higher order, a stud on said pawl, a rim on the disk of lower order with which said stud engages, said rim being provided with an opening therein through which said stud may pass to allow the pawl to engage the disk of higher order, means for operating said disk, and a locking-plate mounted adjacent to said pawl and with either side of which the pawl may engage, substantially as set forth.

38. In a register, the combination of two adjacent register-disks, a pawl for moving one of said disks, a carrying-pawl for the disk of higher order, a stud on said carrying-pawl, a rim on the disk of lower order with which said stud engages, said rim being provided with an opening therein through which said stud may pass to allow the carrying-pawl to engage the disk of higher order, means for operating said pawl and carrying-pawl, and a locking-plate for each of the pawls with either side of which the pawls may engage, substantially as set forth.

39. In a cash-register, the combination with the keys thereof and a money-receptacle disclosed subsequent to the operation of a key, of a register having two register-disks, means for moving each of said disks, a carrying-pawl for the disk of higher order, a stud on said pawl, a rim on the disk of lower order with which said stud engages, said rim being provided with an opening therein through which said stud may pass to allow the pawl to engage the disk of higher order, and means for operating said pawl simultaneously with the concealment of the money-receptacle, substantially as set forth.

40. In a cash-register, the combination with the keys thereof and a money-receptacle disclosed subsequent to the operation of a key, of a register having two register-disks, means for moving each of said disks, a carrying-pawl for the disk of higher order, a stud on said pawl, a rim on the disk of lower order with which said stud engages, said rim being provided with an opening therein through which said stud may pass to allow the pawl to engage the disk of higher order, means for operating said pawl, and means for resetting the pawl, the operating and resetting of the pawl being effected simultaneously with the concealment of the money-receptacle, substantially as set forth.

41. In a cash-register, the combination with the keys thereof, a money-receptacle disclosed subsequent to the operation of a key, and a cam-shaft operated simultaneously with the concealment of the money-receptacle, of a register having two register-disks, means for moving one of said disks, a carrying-pawl for the disk of higher order, a stud on said disk, a rim on the disk of lower order with which said stud engages, said rim being provided with an opening therein through which said stud may pass to allow the pawl to engage the disk of higher order, and a cam on the cam-shaft for operating said pawl, substantially as set forth.

42. In a cash-register, the combination with the keys thereof, a money-receptacle disclosed subsequent to the operation of a key, and a cam-shaft operated simultaneously with the concealment of the money-receptacle, of a register having two register-disks, means for moving one of said disks, a carrying-pawl for the disk of higher order, a stud on said pawl, a rim on the disk of lower order with which said stud engages, said rim being provided with an opening therein through which said stud may pass to allow the pawl to engage the disk of higher order, a cam on the cam-shaft for operating said pawl, and a second cam on the cam-shaft for resetting said pawl, substantially as set forth.

43. In a cash-register, the combination with the keys thereof and a money-receptacle disclosed subsequent to the operation of a key, of a register having two register-disks, means for moving the disk of lower order subsequent to the depression of a key, means for directly moving the disk of higher order simultaneously with the disclosure of the money-receptacle, a carrying-pawl for the disk of higher order, a stud on said pawl, a rim on the disk of lower order with which said stud engages, said rim being provided with an opening therein through which said stud may pass to allow the pawl to engage the disk of higher order, and means for operating said pawl simultaneously with the concealment of the money-receptacle, substantially as set forth.

44. In a cash-register, the combination with the keys thereof and a money-receptacle disclosed subsequent to the operation of a key, of a register having two register-disks, means for moving the disk of lower order subsequent to the depression of a key, means for directly moving the disk of higher order simultaneously with the disclosure of the money-receptacle, a carrying-pawl for the disk of higher order, a stud on said pawl, a rim on the disk of lower order with which said stud engages, said rim being provided with an opening therein through which said stud may pass to allow the pawl to engage the disk of higher order, and means for operating and then resetting said pawl simultaneously with the concealment of the money-receptacle, substantially as set forth.

45. In a cash-register, the combination with the keys thereof and a money-receptacle disclosed subsequent to the operation of a key, of a register-disk for registering units of the lowest order, a normally inactive pawl for operating said disk, means controlled by the operation of any one of several keys to engage the pawl with the register-disk, and means for operating said pawl simultaneously with the concealment of the money-receptacle, substantially as set forth.

46. In a cash-register, the combination with the keys thereof and a money-receptacle disclosed subsequent to the operation of a key, of a register having two register-disks, a pawl for moving the disk of lower order, means controlled by the operation of a key for engaging said pawl with said register-disk, a carrying-pawl for the disk of higher order, said carrying-pawl being controlled by the disk of lower order, and means for operating the pawl and carrying-pawl simultaneously with the concealment of the money-receptacle, substantially as set forth.

47. In a cash-register, the combination with the keys thereof and a money-receptacle disclosed subsequent to the operation of a key, of a register having two register-disks, a pawl for moving the disk of lower order, means controlled by the operation of a key for engaging said pawl with said register-disk, a carrying-pawl for the disk of higher order, said carrying-pawl being controlled by the disk of lower order, a cam-shaft, means for operating said cam-shaft simultaneously with the concealment of the money-receptacle, and cams on the cam-shaft for operating said pawls, substantially as set forth.

48. In a cash-register, the combination with the keys thereof and a money-receptacle disclosed subsequent to the operation of a key, of a register having two register-disks, means for operating the disk of higher order simultaneously with the disclosure of the money-receptacle, an operating-pawl for the disk of lower order normally out of engagement therewith, means controlled by the operation of any one of several keys for engaging said pawl with said disk, a carrying-pawl for the disk of higher order, and means for operating said pawls simultaneously with the concealment of the money-receptacle, substantially as set forth.

49. In a cash-register, the combination with the keys thereof and a money-receptacle disclosed subsequent to the operation of a key, of a register having two register-disks, means for operating the disk of higher order simultaneously with the disclosure of the money-receptacle, a pawl for the disk of lower order, means controlled by the operation of a key for engaging said pawl with said disk, a carrying-pawl for the disk of higher order, a cam-shaft, means for operating said cam-shaft simultaneously with the concealment of the money-receptacle, and cams on said shaft for operating said pawls, substantially as set forth.

50. In a cash-register, the combination with the keys thereof, a stationary money-receptacle and a movable cover therefor, of a register having two register-disks, means for moving one of said disks, a carrying-pawl for the disk of higher order, a stud on said pawl, a rim on the disk of lower order with which said stud engages, said rim being provided with an opening therein through which said stud may pass to allow the pawl to engage the disk of higher order, and means actuated by the movable cover for operating said pawl on the closing movement thereof, substantially as set forth.

51. In a cash-register, the combination with the keys thereof, a stationary money-receptacle, and a movable cover therefor, of a register having two register-disks, means for moving one of said disks, a carrying-pawl for the disk of higher order, a stud on said pawl, a rim on the disk of lower order with which said stud engages, said rim being provided with an opening therein through which said stud may pass to allow the pawl to engage the disk of higher order, and means actuated by the movable cover for operating said pawl and then resetting it on the closing movement of the cover, substantially as set forth.

52. In a cash-register, the combination with the keys thereof, a fixed money-receptacle, and a movable cover therefor, of a register having two register-disks, means for moving the disk of higher order upon the opening of said movable cover, means for moving the disk of lower order subsequent to the operation of a key, a carrying-pawl for the disk of higher order, a stud on said pawl, a rim on the disk of lower order with which said stud engages, said rim being provided with an opening therein through which said stud may pass to allow the pawl to engage the disk of higher order, and connections between said pawl and movable cover for moving the pawl upon the closing movement of the cover, substantially as set forth.

53. In a cash-register, the combination with the keys thereof, a stationary money-receptacle, and a movable cover therefor, of a register having two register-disks, a normally inactive pawl for operating the disk of lower order, means controlled by the operation of a key for engaging the pawl with said disk, and connections between said pawl and the movable cover for operating the pawl upon the closing movement of said cover, substantially as set forth.

54. In a cash-register, the combination with the keys thereof, a stationary money-receptacle and a movable cover therefor, of a register having two register-disks, a normally inactive pawl for operating the disk of lower order, means controlled by the operation of a key for engaging the pawl with said disk, and connections between said pawl and the movable cover for operating the pawl and then resetting it upon the closing movement of the cover, substantially as set forth.

55. In a cash-register, the combination with the keys thereof, a stationary money-receptacle, and a movable cover therefor, of a register having two register-disks, a normally inactive pawl for operating the disk of lower order, a cam-shaft, connections between said cam-shaft and the movable cover, a cam on said shaft for operating said pawl, and means controlled by the operation of a key for engaging said pawl with said disk, whereby the pawl will be operated upon the closing movement of the cover, substantially as set forth.

56. In a cash-register, the combination with the keys thereof, a stationary money-receptacle, and a movable cover therefor, of a register having two register-disks, a normally inactive pawl for operating the register-disk of lower order, means controlled by the operation of a key for engaging said pawl with said disk, connections between the cover and said pawl for moving the latter upon the return movement of the cover, a carrying-pawl for the disk of higher order, and connections between said carrying-pawl and said cover for moving the carrying-pawl upon the return movement of the cover, substantially as set forth.

57. In a cash-register, the combination with the keys thereof, a stationary money-receptacle, and a movable cover therefor, of a register having two register-disks, a normally inactive pawl for operating the register-disk of lower order, means controlled by the operation of a key for engaging said pawl with said disk, connections between the cover and said pawl for moving the latter upon the return movement of the cover, a carrying-pawl for the disk of higher order, connections between said carrying-pawl and said cover for moving the carrying-pawl upon the return movement of the cover, and means operated by said cover for resetting the pawls upon the return stroke, substantially as set forth.

58. In a cash-register, the combination with the keys thereof, a stationary money-receptacle, and a movable cover therefor, of a register having two register-disks, connections between the disk of higher order and the cover for moving the disk directly upon the opening movement of the cover, a normally inactive pawl for moving the disk of lower order, means controlled by the operation of a key for engaging said pawl with said disk, a carrying-pawl for the disk of higher order, and connections between the movable cover and said pawls for operating said pawls upon the return movement of the cover, substantially as set forth.

59. In a cash-register, the combination with the keys thereof, a stationary money-receptacle, and a movable cover therefor, of a register having two register-disks, connections between the disk of higher order and the cover for moving the disk directly upon the opening movement of the cover, a normally inactive pawl for moving the disk of lower order, means controlled by the operation of a key for engaging said pawl with said disk, a carrying-pawl for the disk of higher order, and connections between the movable cover and said pawls for operating said pawls upon the return movement of the cover, substantially as set forth.

60. In a cash-register, the combination with the keys thereof, a stationary money-receptacle, and a movable cover therefor, of a register having two register-disks, connections between the disk of higher order and the cover for moving the disk directly upon the opening movement of the cover, a normally inactive pawl for moving the disk of lower order, means controlled by the operation of a key for engaging said pawl with said disk, a carrying-pawl for the disk of higher order, connections between the movable cover and said pawls for operating said pawls upon the return movement of the cover, and means operated by said cover for resetting said pawls upon the return stroke, substantially as set forth.

61. In a cash-register or analogous device, the combination with two keys and a register having two register-disks, of means for directly operating the disk of higher order controlled by the operation of either of said keys, and means for operating the disk of lower order controlled by one only of said keys, substantially as set forth.

62. In a five-cent cash-register, the combination with a five-cent key and two or more other keys, a series of intermediate actuators selected by said keys, and a primary actuator adapted to move the said intermediate actuators, of a register having two disks, means controlled by the operation of the five-cent key and actuated by the primary actuator for operating the disk of lower order, means controlled by the operation of the other keys and actuated by the primary actuator for actuating the disk of higher order, the keys representing values in odd multiples of five, also controlling the means operated by the five-cent key so that it will be actuated by the primary actuator for operating the disk of lower order, substantially as set forth.

63. In a five-cent cash-register, the combination with a five-cent key, two or more other keys, a series of intermediate actuators selected by the keys, a money-receptacle, and a primary actuator for actuating the intermediate actuators and for disclosing the money-receptacle, of a register having two register-disks, means for directly operating the disk of higher order, controlled by the operation of such other keys upon the disclosure of the money-receptacle, means controlled by the operation of the five-cent key, and actuated by the primary actuator for operating the disk of lower order upon the concealment of the money-receptacle, the other keys representing values in odd multiples of five also controlling the means controlled by the five-cent key, substantially as set forth.

64. In a five-cent cash-register, the combination with the five-cent key and two or more other keys, a fixed money-receptacle, and a movable cover therefor, of a register having two register-disks, means for directly operating the disk of higher order controlled by the operation of the other keys upon the opening of said cover, means controlled by the five-cent key for operating the disk of lower order by the closing of said cover, and means controlled by the other keys representing values in odd multiples of five for operating the disk of lower order by the closing of said cover, substantially as set forth.

65. In a five-cent cash-register, the combination with a series of keys, a money-receptacle, and a series of tablets adapted to be moved subsequent to the operation of a key, of a register having two register-disks, means controlled by the five-cent key for operating the disk of lower order, means operated by the tablet-rods of the other keys for directly operating the disk of higher order, and means controlled by the tablet-rods representing odd multiples of five for operating the disk of lower order simultaneously with the concealment of the money-receptacle, substantially as set forth.

66. In a five-cent cash-register, the combination with a series of keys, a series of tablet-rods, and a money-receptacle disclosed subsequent to the operation of a key, of a register having two register-disks, a normally inactive pawl for operating the disk of lower order, means for operating said pawl, means controlled by the operation of the five-cent key for engaging said pawl with the disk of lower order, means operated by the tablet-rods of the other keys for positively actuating the disk of higher order, and means controlled by the tablet-rods representing odd multiples of five for engaging the pawl for the disk of lower order with said disk, substantially as set forth.

67. In a five-cent cash-register, the combination with a series of keys, a series of tablet-rods, and a money-receptacle disclosed subsequent to the operation of a key, of a register having two register-disks, a normally inactive pawl for operating the disk of lower order, a latch for holding said pawl normally out of operation with the register-disk, stops on the tablet-rods representing five cents and odd multiples of five for disengaging said latch from said pawl, and means for operating said pawl, substantially as set forth.

68. In a five-cent cash-register, the combination with a series of keys, a series of tablet-rods, a stationary money-receptacle and a movable cover therefor, of a register having two register-disks, a normally inactive pawl for operating the disk of lower order, connections between said pawl and the movable cover for operating the pawl, a lock for holding the pawl in a normally inactive position, and a stop on the tablet-rod of the five-cent key and odd multiples of five for disengaging said pawl, substantially as set forth.

69. In a five-cent cash-register, the combination with a series of keys, a series of tablet-rods, and a money-receptacle disclosed subsequent to the operation of a key, of a register having two register-disks, a normally inactive pawl for operating the disk of lower order, means for operating said pawl, a lock for maintaining the pawl in a normally inactive position, a stop on the tablet-rod of the five-cent key and odd multiples of five for disengaging said pawl, and means controlled by all the tablet-rods except that for the five-cent key for directly operating the disk of higher order, substantially as set forth.

70. In a five-cent cash-register, the combination with a series of keys, a series of tablet-rods, and a money-receptacle disclosed subsequent to the operation of a key, of a register having two register-disks, a normally inactive pawl for operating the disk of lower order, means for operating said pawl, a lock for maintaining the pawl in a normally inactive position, a stop on the tablet-rod of the five-cent key and odd multiples of five for disengaging said pawl, means controlled by all the tablet-rods except that for the five-cent key for directly operating the disk of higher order, and a carrying-pawl between the two disks operated simultaneously with the concealment of the money-receptacle, substantially as set forth.

71. In a five-cent cash-register, the combination with a series of keys, a series of tablet-rods, and a money-receptacle disclosed subsequent to the operation of a key, of a register having two register-disks, a normally inactive pawl for operating the disk of lower order, means for operating said pawl, a lock for maintaining the pawl in a normally inactive position, a stop on the tablet-rod of the five-cent key and odd multiples of five for disengaging said pawl, means controlled by all the tablet-rods except that for the five-cent key for directly operating the disk of higher order, a carrying-pawl between the two disks operated simultaneously with the concealment of the money-receptacle, and means for resetting both pawls simultaneously with such movement, substantially as set forth.

72. In a five-cent cash-register, the combination with a series of keys, a series of tablet-rods, and a money-receptacle disclosed subsequent to the operation of a key, of a register having two register-disks, a normally inactive pawl for operating the disk of lower order, means for operating said pawl, a lock for maintaining said pawl in a normally inactive position, a stop on the five-cent tablet-rod and odd multiples of five for disengaging said pawl, a tilting frame, connections between said tilting frame and the disk of higher order, and lugs on the tablet-rods for all the keys except the five-cent key for operating said tilting frame, substantially as set forth.

73. In a five-cent cash-register, the combination with a series of keys, a series of tablet-rods, and a money-receptacle disclosed subsequent to the operation of a key, of a register having two register-disks, a normally inactive pawl for operating the disk of lower order, means for operating said pawl, a lock for maintaining said pawl in a normally inactive position, a stop on the five-cent tablet-rod and odd multiples of five for disengaging said pawl, a tilting frame, connections between said tilting frame and the disk of higher order, and lugs on the tablet-rods for all the keys except the five-cent key for operating said tilting frame, said tablet-rods being arranged in pairs with the lugs of each pair in the same plane and one rod of each pair carrying the stop for disengaging the pawl for the disk of lower order, substantially as set forth.

74. In a five-cent cash-register, the combination with a series of keys, a series of tablet-rods, a stationary money-receptacle and a movable cover therefor, of a register having two register-disks, a normally inactive pawl for the disk of lower order, a lock for maintaining said pawl in its normal position, a stop on the five-cent tablet-rod and odd multiples of five for engaging said pawl with the register-disk, and means operated by the cover for actuating said pawl, substantially as set forth.

75. In a five-cent cash-register, the combination with a series of keys, a series of tablet-rods, a stationary money-receptacle and a movable cover therefor, of a register having two register-disks, a normally inactive pawl for the disk of lower order, a lock for maintaining said pawl in its normal position, a stop on the five-cent tablet-rod and odd multiples of five for engaging said pawl with the register-disk, means operated by the cover for actuating said pawl, and means operated by said cover for resetting the pawl upon the return stroke, substantially as set forth.

76. In a five-cent cash-register, the combination with a series of keys, a series of tablet-rods, a stationary money-receptacle and a movable cover therefor, of a register having two register-disks, a normally inactive pawl for operating the disk of lower order, a cam-shaft, connections between said cam-shaft and the cover, a cam on said shaft for operating the pawl, a stop on the five-cent tablet-rod and odd multiples of five for disengaging the pawl and allowing it to engage the disk of lower order, and connections between all the tablet-rods except that corresponding to the five-cent key for operating the disk of higher order, substantially as set forth.

77. In a cash-register, the combination with the keys thereof and an actuating lever or handle arranged to be operated subsequently to the operation of the key, of a register-disk for registering units of the lowest order, a normally inactive pawl for operating said disk, means controlled by the operation of a number of said keys to engage the pawl with the register-disk, and means for operating said pawl simultaneously with a movement of said actuating lever or handle, substantially as set forth.

78. In a cash-register, the combination with the keys thereof and an actuating lever or handle arranged to be operated subsequently to the operation of the key, of a register having two register-disks, a pawl for moving the disk of lower order, means controlled by the operation of a key for engaging said pawl with said register-disk, a carrying-pawl for the disk of higher order, said carrying-pawl being controlled by the disk of lower order, and means for operating the pawl and carrying-pawl simultaneously with a movement of said actuating lever or handle, substantially as set forth.

79. In a cash-register, the combination with the keys thereof and an actuating lever or handle arranged to be operated subsequently to the operation of the key, of a register having two register-disks, means for moving one of said disks, a carrying-pawl for the disk of higher order, a stud on said pawl, a rim on the disk of lower order with which said stud engages, said rim being provided with an opening therein, through which said stud may pass to allow the pawl to engage the disk of higher order, and means actuated by said lever or handle for operating said pawl on the negative stroke thereof, substantially as set forth.

80. In a cash-register, the combination with the keys thereof and an actuating lever or handle arranged to be operated subsequently to the operation of the key, of a register having two register-disks, a normally inactive pawl for operating the disk of lower order, a cam-shaft, connections between said cam-shaft and the actuating lever or handle, a cam on said shaft for operating said pawl to cause it to operate its disk, and means controlled by the operation of a key for engaging said pawl with said disk, whereby the pawl will be operated upon the negative stroke of the actuating lever or handle, substantially as set forth.

81. In a cash-register, the combination with the keys thereof and an actuating lever or handle arranged to be operated subsequently to the operation of the key, of a register having two register-disks, connections between the disk of higher order and said lever or handle for moving the disk directly on the positive stroke of said lever or handle, a normally inactive pawl for moving the disk of lower order, means controlled by the operation of a key for engaging said pawl with said disk, a carrying-pawl for the disk of higher order, and connections between said actuating lever or handle, and said pawls for operating said pawls upon the negative stroke of said lever or handle, substantially as set forth.

82. In a five-cent cash-register, the combination with the five-cent key and two or more other keys, and an actuating lever or handle arranged to be operated subsequently to the operation of the key, of a register having two register-disks, means for directly operating the disk of higher order controlled by the operation of the keys other than the five-cent key upon the movement of said actuating lever or handle, means controlled by the five-cent key for operating the disk of lower order by the negative stroke of said lever or handle, the keys representing values in odd multiples of five also controlling the means controlled by the five-cent key.

83. In a five-cent cash-register, the combination with a series of keys, a series of tablet-rods, and an actuating lever or handle arranged to be operated subsequently to the operation of the key, of a register having two register-disks, a normally inoperative pawl for operating the disk of lower order, means for operating said pawl, means controlled by the operation of the five-cent key for engaging said pawl with the disk of lower order, means operated by the tablet-rods of the other keys for positively operating the disk of higher order, the keys representing odd multiples of five also controlling the means controlled by the five-cent key.

84. In a cash-register the combination with a register of a pawl for operating the same, a stationary projection to one or the other side of which the pawl is arranged to operate to actuate the register or play free of the same and means for predetermining to which side of the projection the pawl will pass when operated.

85. In a cash-register the combination with a register, of a pawl for operating the same having a beveled projection, a stationary beveled flange which said pawl is arranged to strike and thereby be moved backward out of registering position and means for predetermining whether the pawl will strike said stationary projection or pass free of the same to effect the registration.

86. In a cash-register the combination with a series of registers, of registering elements formed with notched flanges, a series of transfer-pawls having projections arranged to operate on opposite sides of said flanges and means whereby the pawl projections may be adjusted from the inner to the outer surfaces of said flanges.

87. In a cash-register the combination with registering elements formed with notched flanges, of a series of operating-pawls having projections arranged to operate on opposite sides of said flanges to position the pawls and a stationary projection for positively holding the pawls in the positions in which they have been set during the operative cycle of said pawls.

This specification signed and witnessed this 6th day of January, 1899.

FRANCIS C. OSBORN.

Witnesses:
 ANNIE M. GREGORY,
 BURT E. KNAPP.